United States Patent
Lux et al.

(10) Patent No.: US 10,658,668 B2
(45) Date of Patent: May 19, 2020

(54) LITHIUM-SULFUR ACCUMULATOR

(71) Applicant: Bayerische Motoren Werke Aktiengesellschaft, Munich (DE)

(72) Inventors: Simon Lux, Oakland, CA (US); Philipp Oberhumer, Munich (DE); Barbara Stiaszny, Aichach (DE); Ann-Christin Gentschev, Belmont (DE); Jakub Reiter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 169 days.

(21) Appl. No.: 15/488,048

(22) Filed: Apr. 14, 2017

(65) Prior Publication Data

US 2017/0222227 A1    Aug. 3, 2017

Related U.S. Application Data

(63) Continuation of application No. PCT/EP2015/072203, filed on Sep. 28, 2015.

(30) Foreign Application Priority Data

Oct. 16, 2014   (DE) .................. 10 2014 221 046

(51) Int. Cl.
*H01M 4/62* (2006.01)
*H01M 4/58* (2010.01)
(Continued)

(52) U.S. Cl.
CPC ......... *H01M 4/628* (2013.01); *H01M 2/1686* (2013.01); *H01M 4/133* (2013.01);
(Continued)

(58) Field of Classification Search
CPC .... H01M 4/628; H01M 2/1686; H01M 4/133; H01M 4/382; H01M 4/5815;
(Continued)

(56) References Cited

U.S. PATENT DOCUMENTS

2004/0101753 A1    5/2004  Hwang
2013/0052489 A1*   2/2013  Zhamu .................. B82Y 30/00
                                                   429/50
(Continued)

FOREIGN PATENT DOCUMENTS

CN    102683659 A    9/2012
CN    103950239 A    7/2014
(Continued)

OTHER PUBLICATIONS

Wang et al., Reduced graphene oxide fils as a shuttle-inhibiting interlayer in a lithium sulfur battery, 2013, Journal of Power Sources 242, p. 65-69) (Year: 2013).*

(Continued)

*Primary Examiner* — Helen Oi K Conley
(74) *Attorney, Agent, or Firm* — Crowell & Moring LLP

(57) ABSTRACT

A lithium-sulfur battery which includes an electrolyte containing lithium-ions, an anode and a cathode containing sulfur. The lithium-sulfur battery also contains a surface layer which is arranged between the anode and the cathode. The lithium-sulfur battery further includes areas on the cathode side which contain polysulfides. The surface layer of the lithium-sulfur battery contains at least one graphene layer which is permeable to lithium ions and impermeable to polysulfides.

19 Claims, 5 Drawing Sheets

(51) Int. Cl.
  *H01M 2/16*    (2006.01)
  *H01M 4/38*    (2006.01)
  *H01M 10/052*  (2010.01)
  *H01M 10/0585* (2010.01)
  *H01M 4/133*   (2010.01)
  *H01M 4/587*   (2010.01)
  *H01M 10/0525* (2010.01)
  *H01M 4/136*   (2010.01)

(52) U.S. Cl.
  CPC .......... *H01M 4/382* (2013.01); *H01M 4/587* (2013.01); *H01M 4/5815* (2013.01); *H01M 10/052* (2013.01); *H01M 10/0525* (2013.01); *H01M 10/0585* (2013.01); *H01M 4/136* (2013.01); *H01M 4/625* (2013.01)

(58) Field of Classification Search
  CPC ............... H01M 4/587; H01M 10/052; H01M 10/0525; H01M 10/0585
  See application file for complete search history.

(56) References Cited

U.S. PATENT DOCUMENTS

| | | |
|---|---|---|
| 2013/0160701 A1 | 6/2013 | Arnold et al. |
| 2013/0309571 A1 | 11/2013 | Yoon et al. |
| 2014/0050973 A1 | 2/2014 | Manthiram et al. |
| 2014/0203469 A1 | 7/2014 | Liu et al. |
| 2014/0234702 A1 | 8/2014 | Zhang et al. |
| 2015/0104690 A1 | 4/2015 | Xiao et al. |

FOREIGN PATENT DOCUMENTS

| | | |
|---|---|---|
| CN | 103972467 A | 8/2014 |
| DE | 10 2013 209 982 A1 | 12/2014 |
| DE | 10 2014 114 439 A1 | 4/2015 |

OTHER PUBLICATIONS

International Search Report (PCT/ISA/210) issued in PCT Application No. PCT/EP2015/072203 dated Jun. 9, 2016 with English-language translation (six (6) pages).

German-language Written Opinion (PCT/ISA/237) issued in PCT Application No. PCT/EP2015/072203 dated Jun. 9, 2016 (seven (7) pages).

German Search Report issued in counterpart German Application No. 10 2014 221 046.1 dated Jun. 18, 2015 with partial English-language translation (thirteen (13) pages).

English translation of Chinese-language Office Action issued in counterpart Chinese Application No. 201580051270.8 dated Oct. 12, 2018 (12 pages).

Chinese-language Office Action issued in counterpart Chinese Application No. 201580051270.8 dated Jul. 8, 2019 with English translation (12 pages).

Li et al., "Nanoscale Stabilization of Li-Sulfur Batteries by Atomic Layer Deposited $Al_2O^3$", RSC Adv, 2014, pp. 27126-27129, vol. 4, (four (4) pages).

Yu et al., "Performance Enhancement Of A Graphene-Sulfur Composite As A Lithium-Sulfur Battery Electrode By Coating With An Ultrathin Al2O3 Film Via Atomic Layer Deposition", J. Mater. Chem. A, The Royal Society of Chemistry, 2014, pp. 7360-7366, vol. 2, (seven (7) pages).

\* cited by examiner

LITHIUM-SULFUR ACCUMULATOR

CROSS REFERENCE TO RELATED APPLICATIONS

This application is a continuation of PCT International Application No. PCT/EP2015/072203, filed Sep. 28, 2015, which claims priority under 35 U.S.C. §119 from German Patent Application No. 10 2014 221 046.1, filed Oct. 16, 2014, the entire disclosures of which are herein expressly incorporated by reference.

BACKGROUND AND SUMMARY OF THE INVENTION

As in the case of present-day lithium ion batteries, charge transport within the electrolyte of a rechargeable lithium-sulfur battery occurs by means of lithium ions. However, in the case of a rechargeable lithium-sulfur battery, a chemical reaction in which substances are largely transformed takes place, with crystals of sulfur or lithium sulfide also being freshly formed or dissolved, while in the case of present-day lithium ion batteries, an intercalation reaction takes place on the anode side and the cathode side. Like lithium batteries, rechargeable lithium-sulfur batteries can contain lithium metal or an alloy or a composite which is characterized by intercalation of lithium.

During discharging, lithium ions go over from the anode into the electrolyte. At the cathode and in the electrolyte, the lithium ions combine with sulfur or with sulfides, with lithium sulfides being formed and being able to precipitate. In the case of complete discharge, the lithium sulfide $Li_2S$ is formed:

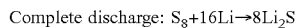

Complete discharge: $S_8 + 16Li \rightarrow 8Li_2S$

During the charging process, the compound formed is dissolved again and sulfur ($S_8$) can be formed. On the negative pole side, lithium metal is deposited again, a lithium alloy is formed or intercalation of lithium occurs, while at the positive pole, the sulfides are oxidized again, with elemental sulfur being able to be formed in the case of a complete reaction:

Complete charging process: $8Li_2S \rightarrow S_8 + 16Li$

However, the oxidation does not necessarily have to proceed to completion, so that $Li_2S_8$ or relatively short-chain polysulfides, for example, can also be formed during the charging process.

Mixtures of various lithium sulfides are formed as intermediates during discharging and charging. During discharging, the proportion of sulfur in the mixture decreases continuously, while the lithium content increases continuously. This can be depicted schematically by the following sequence (discharging, schematic order)

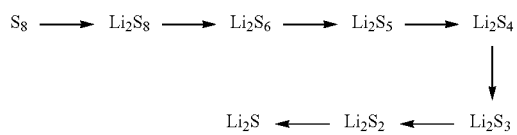

where the respective sulfides can be present side-by-side in very different concentrations in the mixture.

Rechargeable lithium-sulfur batteries are used for the storage of electric energy. High reliability and durability are first and foremost of key importance for the use of rechargeable lithium-sulfur batteries as energy stores both for mobile and stationary applications.

It is therefore an object of the invention to provide a rechargeable lithium-sulfur battery which is characterized with greater reliability, higher stability and a longer battery life.

This and other objects are achieved by using a rechargeable lithium-sulfur battery in accordance with embodiments of the invention.

The present invention provides a rechargeable lithium-sulfur battery which includes an electrolyte containing lithium ions, an anode and a sulfur-containing cathode. The rechargeable lithium-sulfur battery of the invention further contains a surface layer arranged between the anode and the cathode. The rechargeable lithium-sulfur battery of the invention has areas on the cathode-side which contain polysulfides. In one aspect, the surface layer includes at least one graphene layer which is permeable to the lithium ions and impermeable to the polysulfides.

The life of conventional rechargeable lithium-sulfur batteries is often limited to only a few charging-discharging cycles (frequently from about 2 to 100). One of the reasons for this is attributed to aging or degradation of the anode. Further causes include washing-out of the sulfur in the cathode and also degradation of the electrolyte. The degradation of the anode is brought about by undesirable reactions of the anode materials, for instance of lithium, with impurities, in particular by reaction with polysulfides. This leads to a reduction in the capacity, the gravimetric and volumetric energy density and also the life of conventional rechargeable lithium-sulfur batteries.

In rechargeable lithium-sulfur batteries, polysulfides are formed first and foremost during the discharging process by the reduction of the sulfur at the cathode and are partly soluble in the electrolyte. In many conventional rechargeable lithium-sulfur batteries, polysulfides can thus pass largely unhindered to the anode.

In contrast, in the rechargeable lithium-sulfur battery of the invention, passage of the polysulfides to the anode is prevented by means of a contiguous, area-covering surface layer arranged between the anode and the cathode. In particular, the surface layer can be arranged after the cathode. Consequently, the rechargeable battery of the invention contains polysulfides in areas which are located on the cathode side of the surface layer, while barely any or even no polysulfides are present on the anode side of the surface layer.

While the surface layer of the rechargeable battery of the invention suppresses passage of polysulfides, it is at the same time permeable to lithium ions. The permeability of the surface layer to lithium ions is essential since the lithium ions go over to the cathode during discharging and charging must be able to follow the reverse path.

Since the surface layer allows lithium ions to pass, i.e., is permeable to lithium ions, while it does not allow polysulfides to pass, i.e., is impermeable to polysulfides, the surface layer can also be referred to as a semipermeable or semi blocking layer. The use of the surface layer protects the anode from polysulfides, impurities and decomposition products of the electrolyte which are formed at the cathode and improves the stability of the anode and also of the entire rechargeable battery, in particular the stability over many charging-discharging cycles. In addition, the polysulfides are located closer to the cathode, which assists with redeposition on the cathode.

In one aspect, the semi blocking surface layer of the rechargeable lithium-sulfur battery of the invention includes at least one graphene layer which is permeable to lithium ions and impermeable to polysulfides. For example, it is possible for the surface layer to be completely free of materials derived from polymers or ceramics. Conventional semipermeable layers, in contrast, frequently consist of polymers or ceramics. In another aspect, the surface layer can also include at least one graphene layer which is permeable to lithium ions and impermeable to polysulfides. For example, said graphene layer can also be a contiguous, area-covering graphene layer.

The inventors of the present invention have recognized that a surface layer containing at least one graphene layer which is permeable to lithium ions and at the same time impermeable to polysulfides allows effective protection of the anode of a rechargeable lithium-sulfur battery against polysulfides, without hindering the ion transport of lithium ions in the rechargeable battery.

While graphene is in principle impermeable to ions and molecules, the permeability of graphene can be modified and matched selectively to particular ionic radii and molecular sizes by targeted introduction of defects, flaws and holes or pores into the graphene layer. The present inventors have recognized that it is possible in this way to control the permeability of the graphene layer in such a way that lithium ions with their small ionic radius can pass through the graphene layer while at the same time the larger polysulfides can be effectively held back. The present inventors have found that such a graphene layer and also a surface layer containing at least one such graphene layer displays particularly high permeability to lithium ions, while at the same time it holds back polysulfides with particularly high reliability. In particular, the present inventors have recognized that significantly higher selectivity can be achieved in this way than in the case of other semipermeable layers, for example layers derived from polymers or ceramics, as are used in conventional rechargeable lithium-sulfur batteries. Thus, the use of the surface layer according to the invention allows more effective protection of the anode of the rechargeable lithium-sulfur battery of the invention against polysulfides than in the case of semipermeable layers which do not contain such graphene layers. For example, significantly improved protection against short-chain polysulfides, which can often pass through semipermeable layers of conventional rechargeable batteries, can also be achieved in this way. This increases the cycling stability and life of the rechargeable battery of the invention compared to conventional rechargeable batteries.

Conventional rechargeable lithium-sulfur batteries frequently have semipermeable layers which have a comparatively large thickness, in particular layers having a thickness far above a hundred nanometers or even thicknesses in the micron range. The inventors of the present invention have, in contrast, found that the use of such thick layers can be avoided when a surface layer having at least one graphene layer which is permeable to lithium ions and impermeable to polysulfides is used instead. The surface layer performs the task of holding back polysulfides while allowing lithium ions to pass through with a significantly smaller thickness. This makes a higher volumetric energy density of the rechargeable battery possible and avoids an increase in the internal resistance of the rechargeable battery due to thick ceramic layers which have poor conductivity.

The inventors have additionally recognized that the high chemical and mechanical stability of graphene leads to a particularly high chemical and mechanical stability of the surface layer. The inventors have also found that the surface layer as described has a high chemical and mechanical stability despite a comparatively small thickness.

The comparatively low weight of graphene and the saving of material made possible by reducing the thickness of the surface layer additionally allows for a higher gravimetric energy density of the rechargeable battery of the invention.

Various exemplified embodiments of the rechargeable lithium-sulfur battery of the invention are presented below.

In one preferred embodiment of the invention, a rechargeable lithium-sulfur battery is provided with a surface layer is arranged on a cathode. The surface layer can, in particular, be applied directly to the cathode. The direct arrangement of the surface layer on the cathode has the effect that the polysulfides which are formed at the cathode always remain in the region of the cathode. Since the cathode is frequently characterized by a porous structure in which the pores can be filled with electrolyte, in such an arrangement, the polysulfides can dissolve in the electrolyte within this pore structure but without being able to pass through the surface layer arranged on the cathode. The polysulfides therefore cannot penetrate freely into other regions of the rechargeable battery. Arrangement directly on the cathode thus not only protects the anode from polysulfides but also avoids contamination of other regions of the rechargeable battery with polysulfides and any reaction or precipitation products thereof.

In another embodiment of the invention, a rechargeable lithium-sulfur battery is provided which includes a separator arranged between an anode and a cathode, with a surface layer being arranged on the separator. For example, the surface layer can be arranged on the separator on the cathode side, but can also be arranged on the separator on the anode side. The inventors have recognized that the application of the surface layer onto the separator can be carried out with a smaller technical outlay, since the surface structure of the separator is frequently smoother than the surface structure of the electrodes. In particular, the separator can be chemically modified more easily. This allows simpler application. Cathode-side application to the separator additionally has the advantage that the polysulfides are in this way also kept away from the separator and cannot penetrate into the separator. This ensures that the structure of the separator, for example pores of the separator, is/are free of polysulfides and reaction or precipitation products thereof.

Furthermore, the surface layer can also be arranged directly on the anode in the rechargeable lithium-sulfur battery of the invention. In particular, the surface layer can be arranged on the anode on the cathode side. Arrangement directly on the anode has the effect that the anode materials, for instance lithium, are in this way directly provided with a layer which protects against polysulfides and prevents intrusion into the region of the anode. In this way, the anode can additionally not only be protected from polysulfides of the cathode but also against other impurities whose origin is not the cathode, but instead, for example, the separator.

In another preferred embodiment of the invention, the surface layer of the battery is not electrically connected to the anode or the cathode. This is to prevent the surface layer being subjected to potentials which could lead to undesirable electrochemical reactions, for instance corrosion of the carbon of the graphene layer, during repeated charging and discharging operations. In this way, it is possible to avoid a change in the selectivity of the surface layer due to carbon corrosion during a long-term operation of the rechargeable battery.

It is also possible for the rechargeable lithium-sulfur battery of the invention to include in addition to the surface layer, at least one further surface layer which is also arranged between the anode and the cathode, with the further surface layer also having at least one graphene layer which is permeable to lithium ions and impermeable to polysulfides. For example, surface layers can be applied to the separator on both sides, i.e., on the cathode side and the anode side. It is, for example, also possible for both the cathode and the anode each to be provided with a surface layer. Other combinations are also possible, including the use of further surface layers.

The present inventors have recognized that utilization of two or more surface layers leads to a significant improvement in the protective effect for the anode, since polysulfides which can still pass in a small amount through the first surface layer can in this way also be kept away from the anode by the second layer. For example, short-chain polysulfides in particular can in this way still be effectively kept away.

In a particularly preferred embodiment of the invention, the surface layer includes at least one graphene layer that has pores having a diameter in the range from 0.15 to 2 nm, and more preferably pores having a diameter in the range from 0.15 to 1 nm. Pores having a diameter in this size range allow passage of the lithium ions while they suppress passage of the polysulfides. As an example of the smallest pore size, 0.2 nm is preferred. As an example of the largest pore size, 0.5 nm and in particular 0.3 nm is preferred. For example, even the short-chain lithium disulfide as the smallest polysulfide having only two sulfur atoms can, owing to its size, no longer pass unhindered through pores having a diameter of from 0.2 to 0.5 nm and is even more effectively held back by pores having a diameter of less than or equal to 0.3 nm. On the other hand, lithium ions can pass through pores having a size above 0.15 nm. Even larger pores allow even better permeability to lithium ions. A rechargeable lithium-sulfur battery including a surface layer having at least one graphene layer which has the corresponding pore sizes is characterized with having particularly high ion selectivity, i.e., virtually no polysulfides can pass through the graphene layer in the direction of the anode, while lithium ions can pass very readily through the graphene layer.

In another embodiment of the invention, the at least one graphene layer of the surface layer, which is permeable to lithium ions and impermeable to polysulfides, has O-containing functional groups, in particular groups selected from among hydroxyl, carboxyl, carbalkoxy, carbonyl and alkoxy groups. The provision or modification with oxygen-containing functional groups can be effected on one side or both sides of the graphene.

Even conventional graphene can usually have, in combination with defects in the graphene structure, foreign atoms, in particular hydrogen and oxygen but also further atoms such as nitrogen or sulfur.

In one embodiment, the graphene layer according to the invention can have a particularly high proportion of such foreign atoms. For example, the oxygen content can be particularly high. In this case, the graphene layer can also be referred to as graphene oxide. The proportion of oxygen can, for example, be greater than 5 or even greater than 10 percent by weight based on the weight of the total graphene layer.

Targeted oxidation of graphene thus makes it possible to obtain a particularly high degree of functionalization in respect of oxygen-containing functional groups. A high proportion of oxygen-containing functional groups makes it possible, in particular, to produce not only holes or pores in the graphene layer but also "kinks" or structural deformations of the graphene layer which make the graphene layer permeable to lithium ions.

In a similar way, the properties of the graphene can also be modified by introduction of further functional groups, for instance by introduction of nitrogen-containing functional groups.

Such functional groups and their introduction into graphene layers are, for example, described in more detail in the publications "First-Principle Study of Hydroxyl Functional Groups on Pristine, Defected Graphene, and Graphene Epoxide" by Nahid Ghaderi et al. (J. Phys. Chem. C, 2010, 114 (49), pp 21625-21630), "Nitrogen-Doped Graphene Quantum Dots with Oxygen-Rich Functional Groups" by Yan Li et al. (J. Am. Chem. Soc., 2012, 134 (1), pp 15-18), and "Functionalization of Graphene: Covalent and Non-Covalent Approaches, Derivatives and Applications" by Vasilios Georgakilas et al. (Chem. Rev. 2012, 112, 6156-6214).

Information about such functional groups can, for example, be obtained by means of IR and Raman spectroscopy and also with the aid of thermogravimetric methods. Further information about, for example, the defect structure and the local properties of the graphene can be obtained by Raman spectroscopy. In addition, XPS (X-ray Photoelectron Spectroscopy) can be used for characterizing such functional groups.

In another aspect of the invention, the graphene layer has negatively charged functional groups which are suitable for repelling polysulfides.

The inventors of the present invention have recognized that polysulfides can effectively be prevented from passing through the surface layer by introducing negatively charged functional groups. This is made possible by utilization of the repulsive Coulombic interactions between the negatively charged groups and the likewise negatively charged polysulfides.

In a particularly preferred embodiment, the graphene layer according to the invention contains side chains having zwitterions, i.e., side chains which bear both a positive charge and a negative charge. In this case, electrical neutrality is achieved without free counter ions. Due to the negative charge being located, for example, at the terminal position of the side chain which projects into the electrolyte, it is possible to generate an electric field which repels the negatively charged polysulfide groups at the interface between the surface layer and the electrolyte. A surface layer which has at least one graphene layer which has been modified in this way is particularly effective, in particular in respect of short-chain polysulfides which can be held back only with difficulty on the basis of size alone.

Side chains of this type can, for example, have the following general formula:

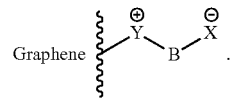

For example, Y can be a quaternary ammonium group and X can be a sulfonic acid group, while B can be, for example, a structural fragment of the formula $-(CH_2)_n-$, where n can assume values in the range from 0 to 10. Possible side chains include, for example, those having the following formula:

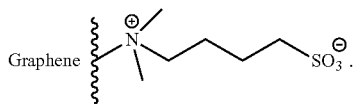

Side chains of this type are described, for example, in the publication "Conjugated Zwitterionic Polyelectrolyte as the Charge Injection Layer for High-Performance Polymer Light-Emitting Diodes" by Junfeng et al. (J. Am. Chem. Soc., 2011, 133 (4), pp 683-685) in connection with light-emitting diodes.

However, X and Y are not restricted to ammonium groups or sulfonic acid groups, but instead Y is a positively charged functional group in general, while X is a negatively charged functional group in general. B is likewise not restricted to the above example and can be a connecting structural element in general; for example, B can also be a chemical bond, an aromatic, a heterocycle or another connecting structural element. For example, B can also represent connected aromatics or fused aromatics.

In another embodiment of the invention, a rechargeable lithium-sulfur battery is provided, with anions which are suitable for repelling polysulfides are bound to a graphene layer. Here, the anions can be bound via coulombic interactions to positively charged functional groups of the at least one graphene layer of the rechargeable lithium-sulfur battery of the invention. Associated ion pairs which can by way of example have the following general formula are thus present:

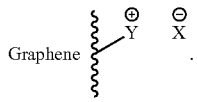

Here, Y is any functional group which has a positive charge and is bound to the graphene layer or is part of the graphene layer, while X is any anion which is joined via coulombic interactions to Y. Y can be, for example, a quaternary ammonium group. X can be, for example, a halide.

The positively charged group can also be part of the graphene layer and, for example, have the following general formula:

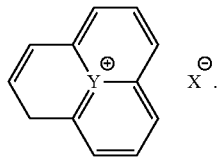

The structural fragment shown here represents a small section of a graphene layer. The anion is to be interpreted as lying on the graphene layer.

Y can in turn be, for example, a nitrogen atom. X can be any anion, for example a halide.

Other aromatic and/or aliphatic structures in which Y is not surrounded by three rings but is instead, in another form, embedded in the graphene layer are also conceivable.

Electrostatic repulsion of the polysulfides can also be achieved by means of associated ion pairs in which the anion is part of the electrolyte while the positive charge is localized on the graphene layer. In this way, the graphene layer can still effectively hold back even polysulfides having a short chain length.

In one aspect of the invention, the rechargeable lithium-sulfur battery is provided with a surface layer has less than 10 percent by weight, in particular less than 2 percent by weight and more preferably, less than 0.5 percent by weight and less than 0.00002 percent by weight of sulfur based on the total weight of the surface layer, or it is entirely free of sulfur.

At least one graphene layer of the surface layer of the rechargeable battery of the invention being largely free of sulfur prevents the surface layer itself being able to liberate sulfur-containing compounds which could, as impurities, undergo undesirable reactions with the anode. This is, for example, of particular importance when the surface layer has been applied to one of the electrodes and is thus subjected to potentials which could lead to an electrochemical reaction of the bound sulfur.

In another embodiment of the invention, a rechargeable lithium-sulfur battery is provided with a cathode having a proportion of sulfur of at least 50 percent by weight based on the total cathode. A very high proportion of sulfur in the cathode increases the energy density of the rechargeable lithium-sulfur battery. For this reason, carbon-sulfur composites, for example, which have a proportion of, for example, 50-90 percent by weight of sulfur, based on the total weight of the composite, are suitable for the cathode.

In one aspect of the invention, the rechargeable lithium-sulfur battery has a surface layer having from 1 to 50, in particular from 1 to 20, also from 1 to 10 and preferably from 1 to 5, graphene layers which are permeable to lithium ions and impermeable to polysulfides. It is also possible for the surface layer to include from 1 to 3 or only one graphene layer which is/are permeable to lithium ions and impermeable to polysulfides. The total weight is lower in the case of having fewer graphene layers. This has a favorable effect on the gravimetric energy density of the rechargeable battery.

In another aspect, the rechargeable lithium-sulfur battery of the invention can, have a surface layer (5) having a thickness of less than 100 nm, in particular less than 50 nm, more preferably less than 20 nm and even more preferably less than 10 nm. Finally, the surface layer can be made even thinner and have a thickness of less than 5 nm, more preferably less than 3 nm and also less than 1 nm. It is also possible for the surface layer to have only the thickness of a monolayer of graphene. The thinner the surface layer, the higher the volumetric energy densities which can be achieved.

In the rechargeable lithium-sulfur battery of the invention, the polysulfides can have the general formula $S_x^{2-}$, where x is an integer and $x \geq 2$. For example, x can assume values of from 2 to 8.

The inventors have recognized that the anode in a rechargeable lithium-sulfur battery according to the invention can also be effectively protected from polysulfides which has only a few sulfur atoms, e.g., from 2 to 8 sulfur atoms.

In the following, a method of determining the permeability in respect of lithium ions and polysulfides will be briefly described. In addition, a process for producing appropriate graphene layers which are permeable to lithium ions and impermeable to polysulfides will be discussed. A method of determining the permeability of aluminum membranes to lithium ions is described in the publication "A study of lithium transport in aluminum membranes" by Elad Pollak et al. (Electrochem. Commun. 2010, 12, 198-201). The measurement method is based on an electrochemical cell having two cell compartments separated from one another by the aluminum membrane to be tested. The method can also be used for measuring the permeability of lithium ions through the above-described surface layer of a rechargeable battery according to the invention. For this purpose, the surface layer, which is very thin compared to the aluminum membrane in Pollak et al., can be applied to a support layer which itself does not have any high transport resistances for lithium ions. For example, a separator can serve as a support for the surface layer to be measured. Measurements of the permeability to lithium ions, or the ability of lithium ions to pass through, on the surface layer applied to the support can finally be compared with reference measurements carried out on a support without the surface layer, so that the influence of the support on the measurement can be determined.

The permeability to polysulfide ions can be measured in a vessel having two compartments which are separated from one another, with the surface layer being arranged on a support between the two compartments. The compartments can be, in particular, cells suitable for photometric measurements. While one compartment A is filled with a liquid containing polysulfides (such as disulfides), the second compartment B is filled with a liquid which is free of polysulfides. Such an arrangement allows photometric determination of the content of polysulfides. For example, the increase in the content of polysulfides in the compartment B or alternatively the decrease in the content of polysulfides in the compartment A can be measured by means of UV/VIS photometry.

Various methods can be used for introducing defects or pores into a conventional graphene layer in order to obtain the graphene layer described in the present invention, which is permeable to lithium ions and impermeable to polysulfides.

In principle, introduction of appropriate defects can be effected by a number of methods, for example by thermal treatment or by bombardment with atoms, ions or molecules (for example by means of sputtering or ion milling). Furthermore, appropriate defects can also be introduced by mechanical treatment involving stretching and bending, but in particular by chemical methods such as pickling and oxidation. In addition, it is possible to produce appropriate pores and defects by irradiation (such as using laser, radioactive radiation, microwaves, sound, or electromagnetic radiation). Finally, it is possible to combine a plurality of these methods with one another.

An example of a process which is suitable for producing graphene layers having pores in the nanometer range is described in the U.S. Patent Publication US 2013/0160701 A1 by Arnold et al. The process, which is based on chemical vapor deposition (CVD), demonstrates how graphene layers which have a pore structure can be formed in a targeted manner by introduction of growth barriers.

A process for the targeted generation of pores in a single graphene layer is described in the publication "Selective Ionic Transport through Tunable Subnanometer Pores in Single-Layer Graphene Membranes" by Sean C. O'Hern et al. (Nano Lett. 2014, 14 (3), pp 1234-1241). The method described combines two different processes with one another. Firstly, defects are produced in the graphene layer by bombardment with ions, for example gallium ions, and these are enlarged by oxidation. The oxidative treatment enlarges the pores to such an extent that they become permeable to particular molecules or ions. The ion selectivity of the graphene membrane described can be set by means of the process parameters, for instance the time of the oxidative treatment.

The inventors of the present invention have recognized that it is possible to produce the surface layer comprising at least one graphene layer which is permeable to lithium ions and impermeable to polysulfides either directly on a component of the future rechargeable lithium-sulfur battery, for instance on the separator, the anode or the cathode, or to complete the production of the surface layer on another support layer. After production of the surface layer on the extraneous support layer, which is used solely for the production process, the surface layer can be applied by means of transfer techniques (e.g., by means of flotation) to the system components of the rechargeable lithium-sulfur battery, for instance to the cathode, the anode or the separator. Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
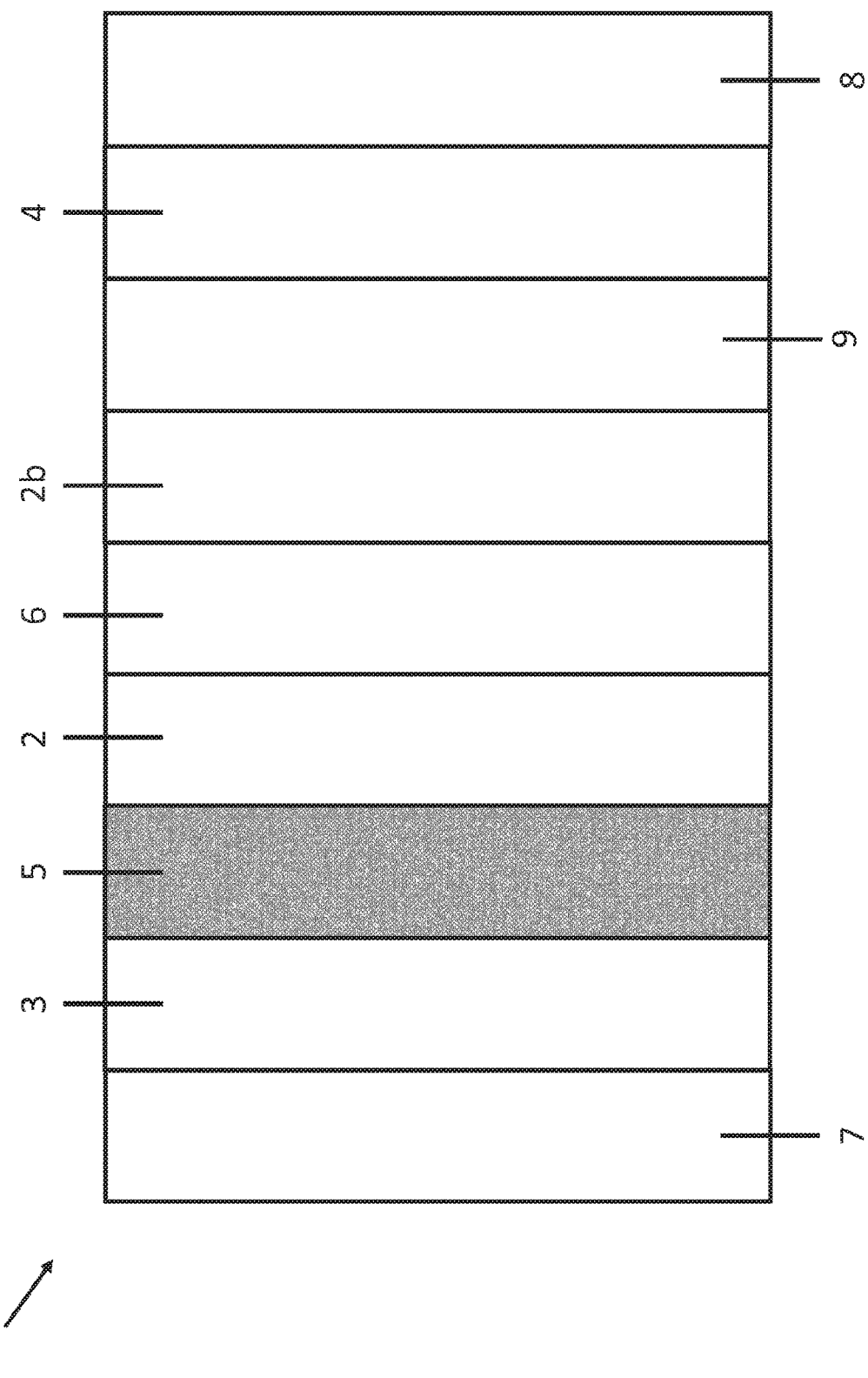
FIG. 1 shows a schematic depiction of a side view of a rechargeable lithium-sulfur battery (1) according to one or more aspects of the present invention.

In FIG. 1, the rechargeable lithium-sulfur battery (1) has an electrolyte (2) containing lithium ions, an anode (3) and a sulfur-containing cathode (4). The anode (3) includes lithium or a lithium-containing metal. The cathode includes sulfur or a cathode composite which can, for example, consist of sulfur and carbon, with the carbon making good conductivities possible. The rechargeable lithium-sulfur battery can further include a separator (6) between the cathode (4) and the anode (3). If the rechargeable lithium-sulfur battery (1) has a separator (6), the electrolyte (2b) present on the cathode side of the separator can be identical to or different from the electrolyte (2) which is present on the anode side of the separator. The electrolytes (2), (2b) can in each case be a solid, gel or liquid electrolyte. The rechargeable lithium-sulfur battery (1) of the invention is characterized, in particular, by a surface layer (5) which is located between anode (3) and cathode (4) and contains at least one graphene layer which is permeable to lithium cations but impermeable to polysulfides.

FIG. 1 also shows the rechargeable battery (1) of the invention in which the surface layer (5) has been applied directly to the anode material (3). An area-covering surface layer (5) which has been applied in this way efficiently protects the anode (3) from polysulfides and further impurities. In addition, the rechargeable lithium-sulfur battery (1) can also include current collectors (7), (8). For example, the rechargeable battery (1) can have a copper current collector (7) on the anode side and an aluminum current collector (8) or another metal on the cathode side. However, a current collector is not necessary in every case, for example a current collector on the anode can be dispensed with when the anode consists of lithium. Appropriate current collectors (7), (8) allow efficient output of the electric current during discharging and efficient introduction of current during charging. For example, the cathode can also be provided with an additional protective layer (9) which protects the cathode from reactions with the electrolyte. It is possible, for example, for the cathode protective layer (9) to contain $AlF_3$ or $Al_2O_3$. Other regions or areas of the rechargeable battery can also have protective layers. For example, the anode can be included with a protective layer.

The reference numerals (1) to (9) referred to in the following drawings have the same meanings as those described for FIG. 1.

Figure 2:
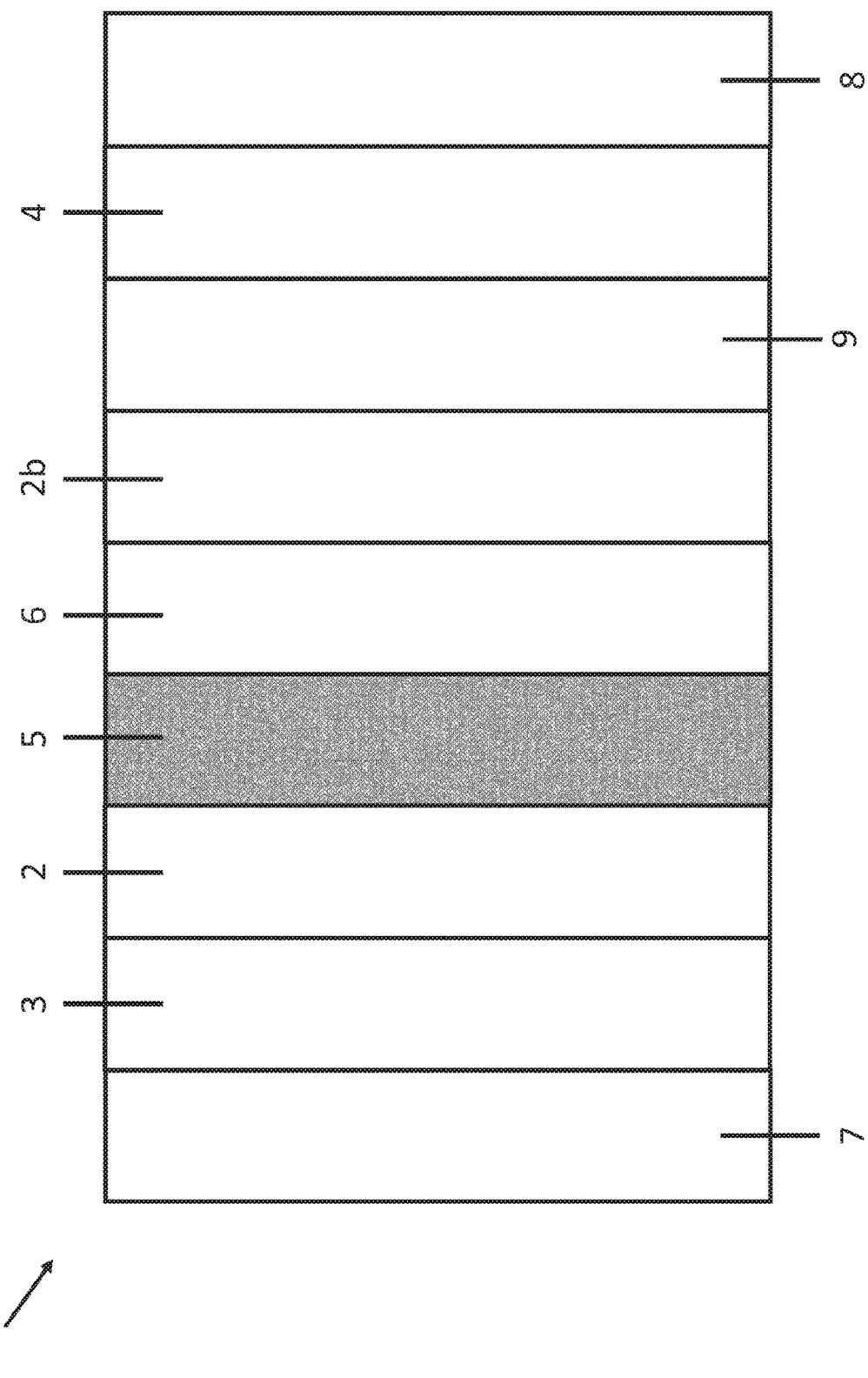
FIG. 2 shows a schematic depiction of a side view of a rechargeable lithium-sulfur battery (1) according to one or more aspects of the present invention.

In FIG. 2, in the rechargeable lithium-sulfur battery as shown, the surface layer has been applied to the separator (6) on the anode side.

Figure 3:
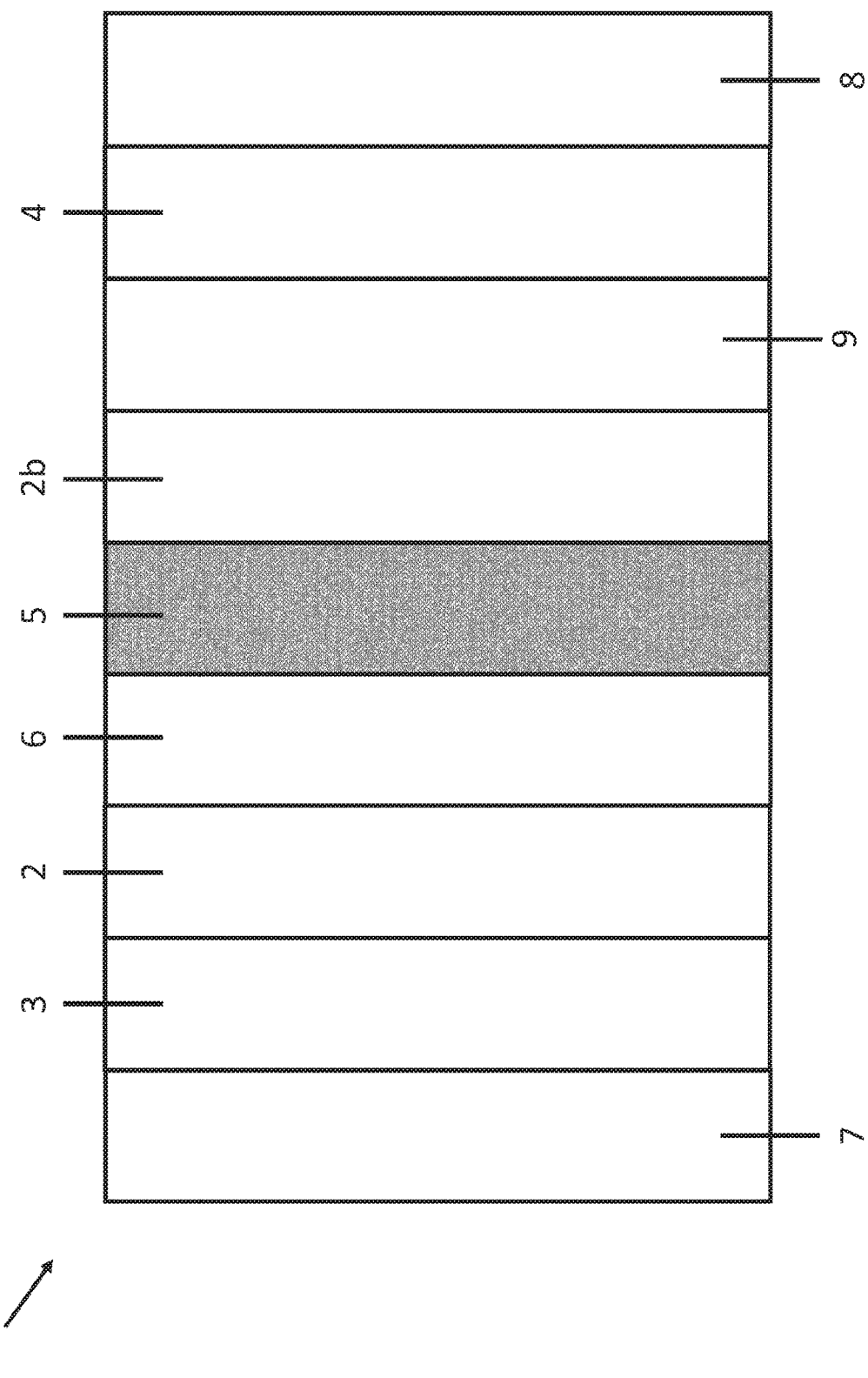
FIG. 3 is a schematic depiction of a side view of a rechargeable lithium-sulfur battery (1) according to the invention, in which the surface layer has likewise been applied to the separator (6).

FIG. 3 shows a rechargeable lithium-sulfur battery (1) according to the invention, in which the surface layer has been applied to the separator (6). In this case, the surface layer (5) is arranged on the separator (6) on the cathode side. In this way, intrusion of polysulfides into the separator is also prevented.

Figure 4:
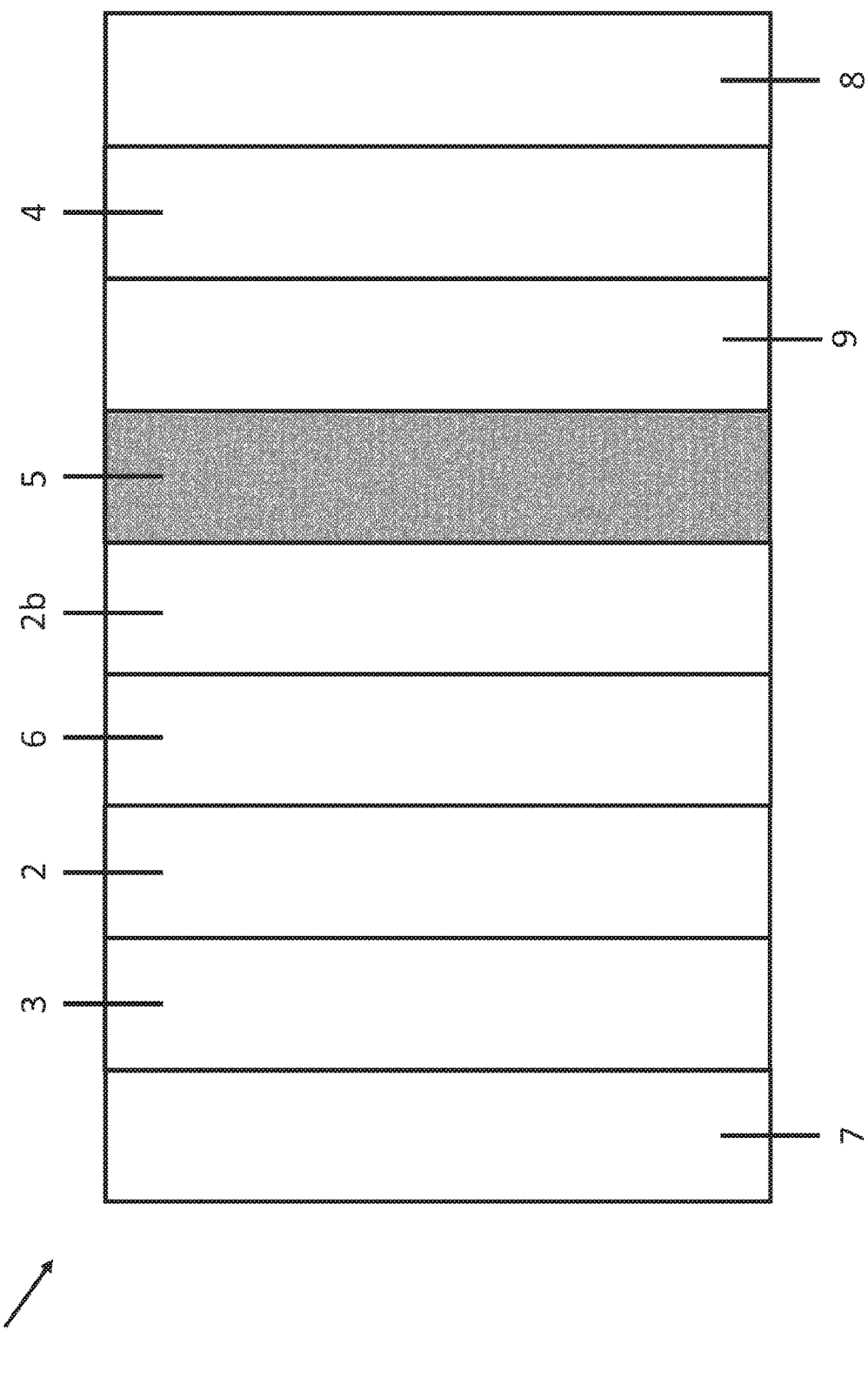
FIG. 4 shows a schematic depiction of a side view of a rechargeable lithium-sulfur battery (1) according to one or more aspects of the present invention, in which the surface layer (5) is arranged directly on the cathode (4).

FIG. 4 shows a rechargeable lithium-sulfur battery (1) according to the invention, in which the surface layer (5) is arranged directly on the cathode (4). In the case of a rechargeable battery configured in this way, the polysulfides cannot penetrate into other regions of the rechargeable battery.

Figure 5:
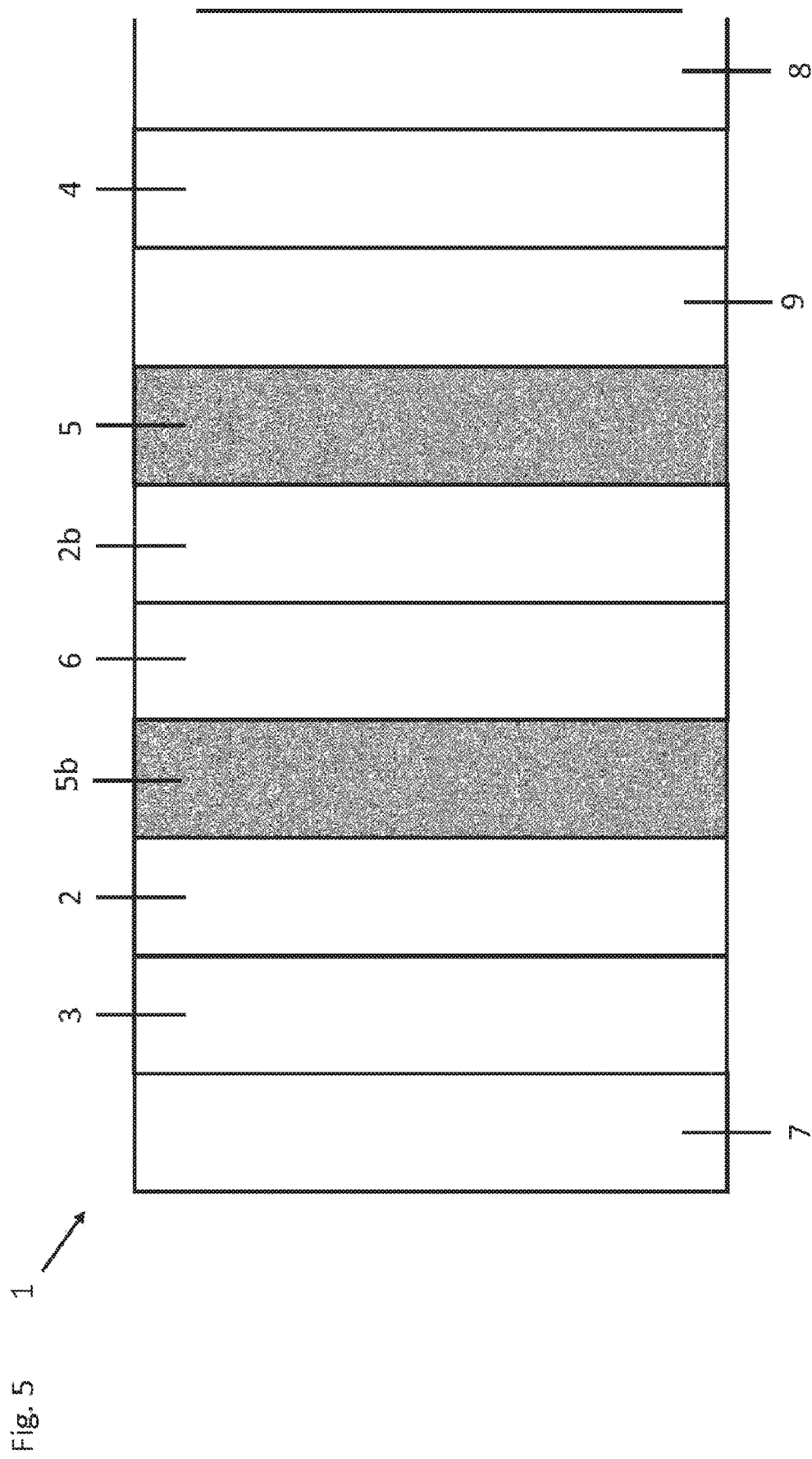
FIG. 5 shows a schematic depiction of a side view of a rechargeable lithium-sulfur battery according to one or more aspects of the invention which includes two surface layers (5) and (5b).

FIG. 5 shows a rechargeable lithium-sulfur battery (1) according to the invention which includes two surface layers (5) and (5b). In the example shown, the first surface layer (5) has been applied to the cathode (4), while a further surface layer (5b) has been applied to the separator (6). The two surface layers (5) and (5b) each contains at least one graphene layer which is permeable to lithium ions but impermeable to polysulfides.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rechargeable lithium-sulfur battery, comprising:
an electrolyte containing lithium ions,
an anode,
a sulfur-containing cathode,
a surface layer arranged between the anode and the cathode,
wherein the rechargeable lithium-sulfur battery further comprises areas on the cathode containing polysulfides,
and wherein the surface layer comprises at least one graphene layer which is permeable to the lithium ions and impermeable to the polysulfides, and wherein the at least one graphene layer has negatively charged functional groups which are suitable for repelling polysulfides, and positively charged functional groups.

2. The rechargeable lithium-sulfur battery according to claim 1, wherein the surface layer is arranged on the cathode.

3. The rechargeable lithium-sulfur battery according to claim 1, further comprises a separator arranged between the anode and the cathode, with the surface layer being arranged on the separator.

4. The rechargeable lithium-sulfur battery according to claim 1, wherein the surface layer is arranged on the anode.

5. The rechargeable lithium-sulfur battery according to claim 1, wherein the surface layer is not electrically connected to the anode or the cathode.

6. The rechargeable lithium-sulfur battery according to claim 1, further comprises at least one further surface layer arranged between the anode and the cathode, wherein the further surface layer comprises at least one graphene layer which is permeable to the lithium ions and impermeable to the polysulfides.

7. The rechargeable lithium-sulfur battery according to claim 1, wherein the graphene layer comprises pores having a diameter in the range from 0.15 nm to 2 nm.

8. The rechargeable lithium-sulfur battery according to claim 1, wherein the graphene layer comprises pores having a diameter in the range from 0.15 to 1 nm.

9. The rechargeable lithium-sulfur battery according to claim 1, wherein the graphene layer comprises O-containing functional groups selected from hydroxyl, carboxyl, carbalkoxy, carbonyl or alkoxy groups.

10. The rechargeable lithium-sulfur battery according to claim 1, wherein anions which are suitable for repelling polysulfides are bound to the graphene layer.

11. The rechargeable lithium-sulfur battery according to claim 1, wherein the surface layer comprises less than 10 percent by weight of sulfur, based on the total weight of the surface layer.

12. The rechargeable lithium-sulfur battery according to claim 1, wherein the surface layer comprises less than 2 percent by weight of sulfur, based on the total weight of the surface layer.

13. The rechargeable lithium-sulfur battery according to claim 1, wherein the surface layer comprises less than 0.5 percent by weight of sulfur, based on the total weight of the surface layer.

14. The rechargeable lithium-sulfur battery according to claim 1, wherein the surface layer is entirely free of sulfur.

15. The rechargeable lithium-sulfur battery according to claim 1, wherein the cathode has a proportion of sulfur of at least 50 percent by weight based on the total cathode.

16. The rechargeable lithium-sulfur battery according claim 1, wherein the surface layer comprises from 1 to 20 graphene layers which are permeable to the lithium ions and impermeable to the polysulfides.

17. The rechargeable lithium-sulfur battery according claim 1, wherein the surface layer comprises from 1 to 10 graphene layers which are permeable to the lithium ions and impermeable to the polysulfides.

18. The rechargeable lithium-sulfur battery according to claim 1, wherein the surface layer has a thickness of less than 10 nm.

19. The rechargeable lithium-sulfur battery according to claim 1, wherein the polysulfides has the general formula $S_x^{2-}$, wherein x is an integer and wherein $x \geq 2$.

* * * * *